(12) United States Patent
Alumbaugh et al.

(10) Patent No.: US 7,659,724 B2
(45) Date of Patent: Feb. 9, 2010

(54) SURVEYING METHOD USING AN ARRANGEMENT OF PLURAL SIGNAL SOURCES

(75) Inventors: David L. Alumbaugh, Berkeley, CA (US); Jiuping Chen, Albany, CA (US); Kevin Eyl, Lafayette, CA (US); Stephen A. Horne, Lafayette, CA (US); Edward Nichols, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 370 days.

(21) Appl. No.: 11/693,275

(22) Filed: Mar. 29, 2007

(65) Prior Publication Data

US 2008/0239875 A1 Oct. 2, 2008

(51) Int. Cl.
 *G01V 3/08* (2006.01)
 *G01V 3/15* (2006.01)
(52) U.S. Cl. ..................................................... 324/365
(58) Field of Classification Search .................. 324/332, 324/334, 337, 345, 347, 357, 365
 See application file for complete search history.

(56) References Cited

U.S. PATENT DOCUMENTS

| | | | |
|---|---|---|---|
| 4,617,518 A | 10/1986 | Srnka | |
| 4,633,182 A | 12/1986 | Dzwinel | |
| 7,362,102 B2 * | 4/2008 | Andreis | 324/365 |
| 2008/0015779 A1 * | 1/2008 | Alumbaugh et al. | 702/10 |

FOREIGN PATENT DOCUMENTS

| | | | |
|---|---|---|---|
| GB | 2070345 | | 9/1981 |
| WO | WO0214906 | | 2/2002 |
| WO | 2006090105 A1 | | 8/2006 |
| WO | 2007097787 A1 | | 8/2007 |
| WO | WO2007/097787 | * | 8/2007 |
| WO | 2007136276 A1 | | 11/2007 |

OTHER PUBLICATIONS

International Search Report, dated Oct. 21, 2008, for PCT/US2008/058578.
Boerner, David E. et al., Orthogonality in CSAMT and MT Measurements, Geophysics, vol. 58, No. 7, Jul. 1993, pp. 924-934.
Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.

(Continued)

*Primary Examiner*—Kenneth J Whittington
(74) *Attorney, Agent, or Firm*—Dan C. Hu; Liangang (Mark) Ye; Kevin McEnaney

(57) ABSTRACT

The survey technique for use in a marine environment to survey a subterranean structure includes providing an arrangement of plural signal sources in a body of water to produce corresponding signals. The signals of the signal sources in the arrangement are set to cause reduction of at least one predetermined signal component in data received by a receiver in response to the signals.

17 Claims, 5 Drawing Sheets

OTHER PUBLICATIONS

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons.

Kaufman, A. et al., Methods in Geochemistry and Geophysics, 16.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

MacGregor, L. et al., The Ramesses Experiment—III. Controlled-Source Electromagnetic Sounding of the Reykjanes Ridge.., Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 1999, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, MARELEC 1999.

Maurer, Hansruedi et al., Optimized Design of Geophysical Experiments, SEG Paper.

Grant, I.S. et al., Electromagnetic Waves, Chapter 11, pp. 365-407.

\* cited by examiner

SURVEYING METHOD USING AN ARRANGEMENT OF PLURAL SIGNAL SOURCES

TECHNICAL FIELD

The invention relates generally to a surveying method in a marine environment in which an arrangement of plural signal sources is provided to produce corresponding signals, where the signals are set such that the signals interact at a receiver to reduce or eliminate at least one predefined component of the signals at the receiver.

BACKGROUND

Various electromagnetic techniques exist to perform surveys of a subterranean structure for identifying layers of interest. Examples of layers of interest in the subterranean structure include subsurface resistive bodies, such as hydrocarbon-bearing reservoirs, gas injection zones, thin carbonate or salt layers, and fresh-water aquifers. One survey technique is the magnetotelluric (MT) survey technique that employs times measurements of electric and magnetic fields (which are responsive to naturally occurring electromagnetic fields) for determining the electrical conductivity distribution beneath the surface. Another survey technique is the controlled source electromagnetic (CSEM) survey technique, in which an electromagnetic transmitter, called a "source," is used to generate electromagnetic signals. With either survey technique, surveying units, called "receivers," are deployed on a surface (such as at the sea floor or on land) within an area of interest to make measurements from which information about the subterranean structures can be derived. The receivers may include a number of sensors for detecting any combination of electric fields, electric currents, and magnetic fields.

In marine environment CSEM surveys, modeling and acquisition studies have shown that thin resistive targets in a subterranean structure, such as hydrocarbon-bearing reservoirs, gas injection zones, thin carbonate or salt layers, fresh water aquifers, and so forth, are more easily detectable when a CSEM source is positioned close to the sea floor. In practice, the CSEM source is positioned is towed, or "flown," as close to the sea floor as the conditions will allow. Typically, the CSEM source will be towed between 30 to 50 meters above the sea floor.

In a deep water marine environment, locating the EM source close to the sea floor can make the EM survey difficult and expensive for various reasons. For example, the EM source has to be hardened to withstand pressures experienced in deep water. In addition, CSEM sources require a large amount of current to create the necessary moment, and the current results in a significant amount of energy that is lost due to resistive heating along a tow cable, which can be up to 6,000 meters in length. Also, in a deep water application, the speed of the sea vessel cannot exceed 1 to 2 knots to prevent the CSEM source from rising towards the sea surface and away from the sea floor.

SUMMARY

In one aspect, the invention relates to a surveying method for use in a marine environment to survey a subterranean structure that includes providing an arrangement of plural signal sources in a body of water to produce corresponding signals, and setting the signals of the signal sources in the arrangement to cause reduction of at least one predetermined signal component in data received by a receiver in response to the signals.

In another aspect, the invention relates to a surveying method for use in a marine environment to survey a subterranean structure that includes providing an arrangement of plural signal sources in a body of water to produce corresponding signals, wherein providing the arrangement of signal sources comprises providing a crossed dipole arrangement in which one signal source is crossed with another signal source.

In another aspect, the invention relates to a system to survey a subterranean structure that includes an arrangement of plural signal sources in a body of water to produce corresponding signals, a receiver to collect data in response to the produced signals, and a signal generator to set the signals produced by the signal sources to reduce at least one predetermined signal component in the data collected at the receiver in response to the produced signals.

In another aspect, the invention relates to a system to survey a subterranean structure that includes an arrangement of plurality signal sources in a body of water to produce corresponding signals, a receiver to collect data in response to the produced signals, and a signal generator to set the signals produced by the signal sources. The arrangement of plural signal sources includes a crossed-dipole source array having a first signal source that is inline with the receiver and a second signal source that is cross-line with the receiver.

In another aspect, the invention relates to a computer-readable storage medium containing instructions that when executed cause a computer to receive data collected by a receiver in response to signals produced by an arrangement of plural signal sources, wherein the signals are set such that the data collected by the receiver has a reduced air-wave effect, and process the data to survey a subterranean structure.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some disclosed examples, a survey technique in a marine environment is provided in which an arrangement of signal sources (e.g., electromagnetic or EM sources) is used, where the signal sources produce signals that are set such that the signals interact to reduce (or eliminate) at least one predefined signal component at a receiver (or plural receivers). The at least one predefined component of the signals that is reduced or eliminated at a receiver can be an unwanted signal component that is insensitive to layers in a subterranean structure. One example of such an unwanted signal component is a signal component due to an air-wave effect. The air-wave effect is caused by an EM signal portion generated by a signal source that follows a path extending upwardly form the signal source to the sea surface, horizontally through the air, and then back downwardly through the seawater to a receiver (usually located on a sea floor).

Survey techniques according to some examples may be used in a deep water environment in which receivers are placed on a sea floor (or proximate the sea floor), while EM sources are placed at or near the sea surface, which can be a relatively large distance away from the sea floor in a deep water application. A deep water application is an application in which water depths (distance from sea surface to sea floor) are 300 meters or greater.

The benefit of towing signal sources close to the sea surface is that the hardware of the signal sources would not have to be hardened (since the signal sources do not have to withstand large pressures at great depths), and the tow cables can be made shorter to provide for less energy loss. Moreover, the surveying can proceed at greater speeds since the sea vessel can tow the signal sources at higher speeds, which allows for shorter acquisition times and reduced acquisition costs. Towing of the signal sources at higher speeds is possible since the signal sources are provided at or close to the sea surface, so that there is less concern associated with rising signal sources towed at high speeds.

Figure 1:
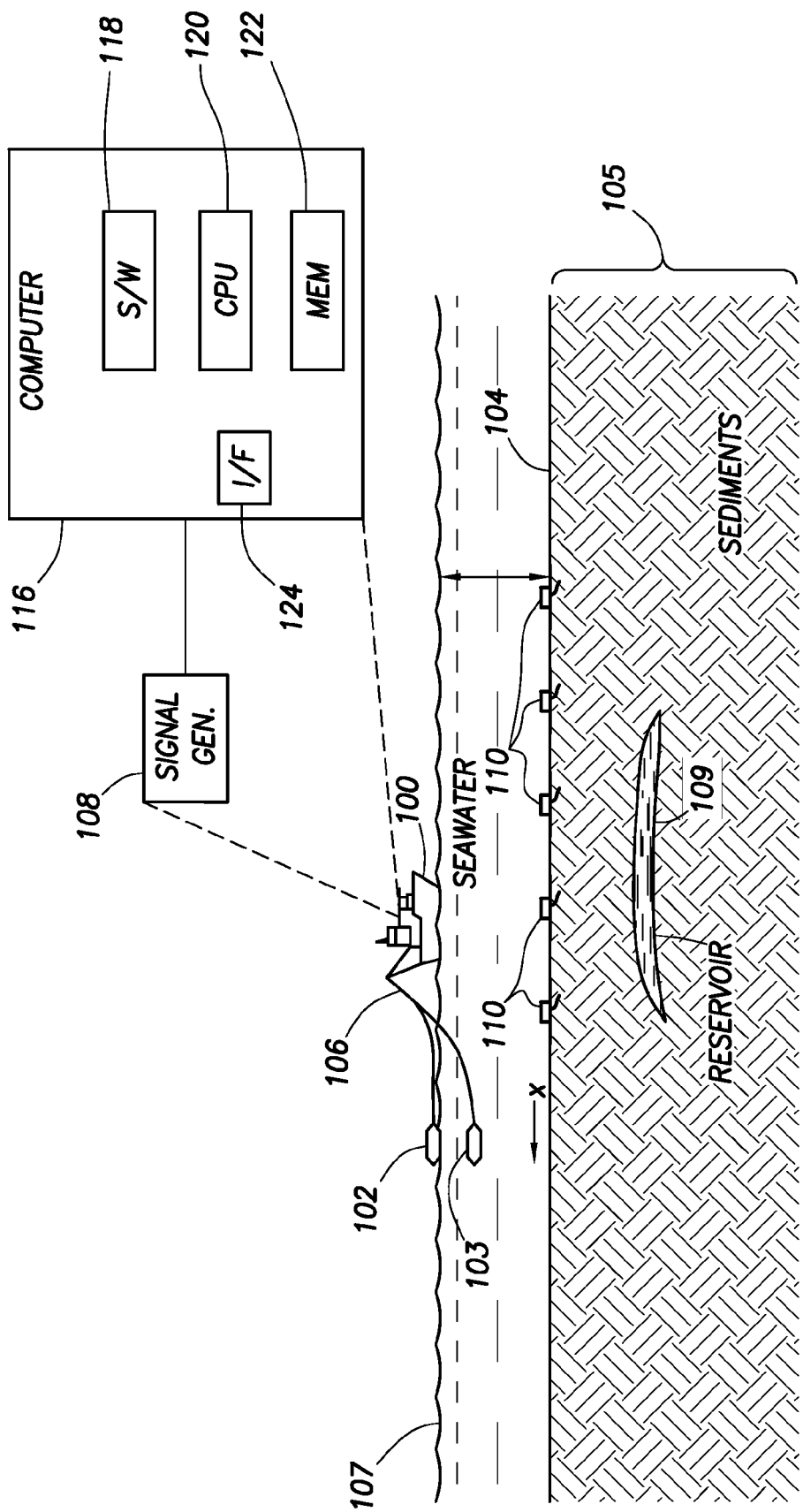
FIG. 1 depicts an example arrangement of signal sources used for performing surveying in a marine environment for surveying a subterranean structure underneath a sea floor.

With CSEM survey techniques, the CSEM sources include EM transmitters that generate EM signals that propagate or diffuse through various layers, including the seawater and layers in a subterranean structure. FIG. 1 depicts a marine or subsea environment that includes signal sources (e.g., EM transmitters) 102 and 103 towed at or near the sea surface 107 for surveying subterranean structures 105. The subterranean structures 105 include a resistive body 109 of interest, such as a hydrocarbon-bearing layer, a gas injection zone, a thin carbonate or salt layer, a fresh water aquifer, and so forth. The EM signals are affected by the subterranean layers, and the signal detected at the receiver 110 located on the surface (in this case the sea floor 104) is representative of that effect. In FIG. 1, plural receivers 110 are located on or near the sea floor 104. Each receiver 110 includes a sensor module having sensing elements to sense one or more of electric fields, electric currents, and magnetic fields. In one example, a plurality of receivers 110 are arranged on the sea floor 104 in a row (in a direction depicted as x). In other examples, the receivers 110 can have other arrangements, such as a square grid of receivers or even a random arrangement of receivers.

As further depicted in the marine arrangement of FIG. 1, a sea vessel 100 is capable of towing the EM transmitters 102, 103 in seawater. In the example shown in FIG. 1, the EM transmitters 102, 103 are horizontal electric dipole transmitters. Other types of transmitters are possible. For example, a horizontal magnetic dipole transmitter may be used. Vertical electric and magnetic dipole receivers may also be used. In addition, other non-dipole transmitters may be used.

The example arrangement of FIG. 1 is a deep water arrangement in which a depth of the sea floor 104 (relative to the sea surface 107) is greater than or equal to 300 meters. By towing the transmitters 102, 103 close to the sea surface 107, the transmitters 102, 103 are relatively far away from the sea floor 104 and the subterranean structure 105. In some examples, the transmitters 102, 103 may be towed within 10 meters of the surface. As noted above, various benefits are provided by transmitters 102, 103 towed at or near the sea surface 107. However, the relatively large distance between the transmitters 102, 103 and receivers 110 and subterranean structure 105 present challenges in being able to acquire accurate surveying data at the receivers 110. One such challenge involves removing the unwanted effects of signal components that are insensitive to layers in the subterranean structure 105 from data measured at a receiver 110.

The EM transmitters 102, 103 are coupled by a tow cable 106 (or multiple cables) to a signal generator 108 on the sea vessel 100. The signal generator 108 controls the frequencies, magnitudes, and phases of the EM signals generated by the transmitters 102, 103.

Each of the receivers 110 includes a storage device for storing the data from the measurements made by the receivers 110. The stored measurements data is retrieved at a later time, such as when the receivers 110 are retrieved to the sea vessel 100. The retrieved measurement data can be uploaded to a computer 116 on the sea vessel 100, which computer 116 has analysis software 118 capable of analyzing the measurement data for the purpose of determining information about the subterranean structure 105. The analysis software 118 in the computer 116 is executable on a central processing unit (CPU) 120 (or plural CPUs), which is coupled to a storage 122. An interface 124 that is coupled to the CPU 120 is provided to allow communication between the computer 116 and an external device. For example, the external device may be a removable storage device containing measurement data measured by the receivers 110. Alternatively, the interface 124 can be coupled to a communications device for enabling communications of measurement data between the computer 116 and the receivers 110, where the communications can be wired communications or wireless communications. The wired or wireless communications can be performed when the receivers 110 have been retrieved to the sea vessel 100. Alternatively, the wired or wireless communications can be performed while the receivers 110 remain on the sea floor 104.

Alternatively, instead of providing the computer 116 (and the analysis software 118) on the sea vessel 100, the computer 116 can instead be located at a remote location (e.g., at a land location). The measurement data from the receivers 110 can be communicated from the sea vessel 100 to the remote location. In one example, the information is communicated by a wireless link, such as a satellite link.

As noted above, survey techniques may involve towing multiple signal sources (an arrangement or array of sources) at or near the sea surface 107, as depicted in FIG. 1. The amplitudes and phases of the signals produced by the signal sources are set such that at least one unwanted EM component of the measured data (at each receiver 110) is reduced or eliminated from data measured at the sea floor 104.

The following describes examples of how signal sources can be arranged to reduce or eliminate unwanted signal components. In one example context, the earth is simplified to a two layer model including an electromagnetic dipole source located below the surface of a conductive medium of uniform conductivity (as in the case of an electric dipole source located in a body of water over a uniform half space of approximately the same electrical conductivity as water). If both the source depth (z) and receiver path (h) are smaller than the lateral separation (R) between the source and receiver, the electric and magnetic fields can be written as:

$$E, H \approx P_0 + P_1 + L, \quad \text{(Eq. 1)}.$$

where E represents the electric field, H represents the magnetic field, $P_0$ represents the direct field response produced by a dipole source in a medium of uniform conductivity, in this case seawater, $P_1$ represents a modified image term that would be generated by a second source also located in a earth of uniform conductivity, but positioned a distance approximately equal to 2z above the true source, and L represents a lateral wave, usually called the "air wave." Note that when subterranean structure is present below the sea bottom, most of the information about that structure can be thought of as being contained in the image term, $P_1$, while $P_0$ and L remains either completely unchanged, or only moderately modified, respectively.

The air wave L attenuates as it travels upwardly from the signal source (102, 103) to the air-water interface (sea surface 107 in FIG. 1). The lateral wave travels laterally along the air-water interface with the amplitude decreasing only through $1/R^3$ geometrical spreading, and the lateral wave further attenuates as it travels vertically downward from the air-water interface to the receiver 110.

The lateral wave L induced by the air-wave effect is an example of an unwanted component that can be detected by a receiver 110 at the sea floor 104, because the lateral wave does not contain information relating to the subterranean structure 105 that is being surveyed.

When considering the earth to consist only of a two layer model, the $P_0$, $P_1$, and L components are easily calculated with analytic expressions that depend only on the water conductivity, the depths of the sources 102, 103 and receivers 110 below the sea surface 107, and the relative distances between the sources 102, 103 and receivers 110. When a source is placed at or near the surface 107 of the sea, these components $P_0$, $P_1$, and L will dominate components that are effected by the subsurface 105. The problem then becomes defining an array of sources whereby the output current amplitudes and phases of the multiple sources are tuned relative to each other such that the unwanted responses with little or no subsurface information are eliminated at the sea floor receivers 110, thus enhancing the reservoir response.

Various different types of source arrays that include at least two dipole sources (such as transmitters 102, 103 in FIG. 1) may be provided at or near the sea surface 107. These two dipole sources are tuned with respect to each other to eliminate at least one unwanted component, such as the air wave, at the receiver location. In other words, the amplitude and phase of the electrical currents in the two sources are adjusted such that, at a receiver 110 at the sea floor 104, a measured unwanted component, such as the air wave, is near or at zero. By reducing or eliminating unwanted components from signals measured by a receiver 110 at the sea floor 104, subsurface structures, such as the resistive body 109 in the subterranean structure 105 can be more accurately detected using the measurement data collected by the receiver 110.

Figure 2C:
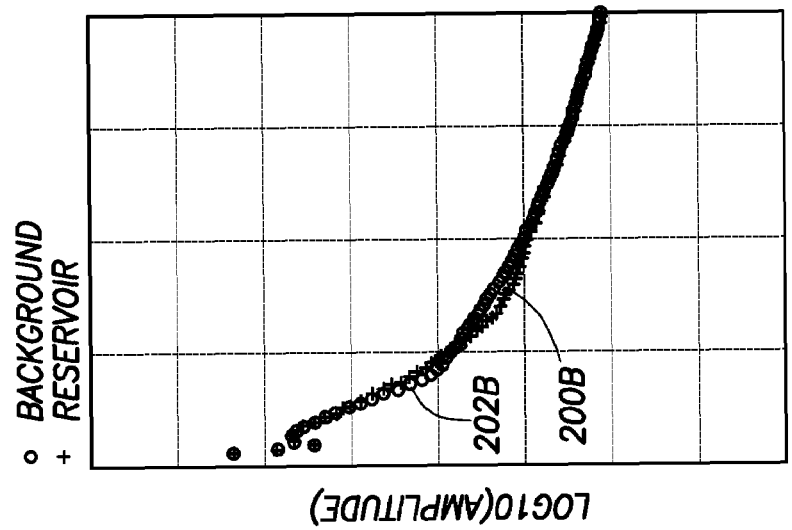
FIGS. 2A-2C are graphs illustrating example relationships of signal amplitudes as a function of source-receiver offsets for a conventional surveying arrangement.
Figure 2B:
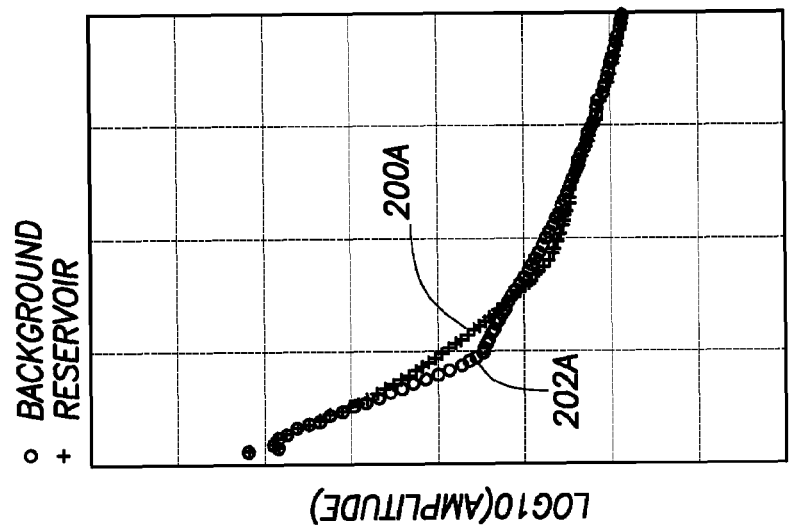
Figure 2A:
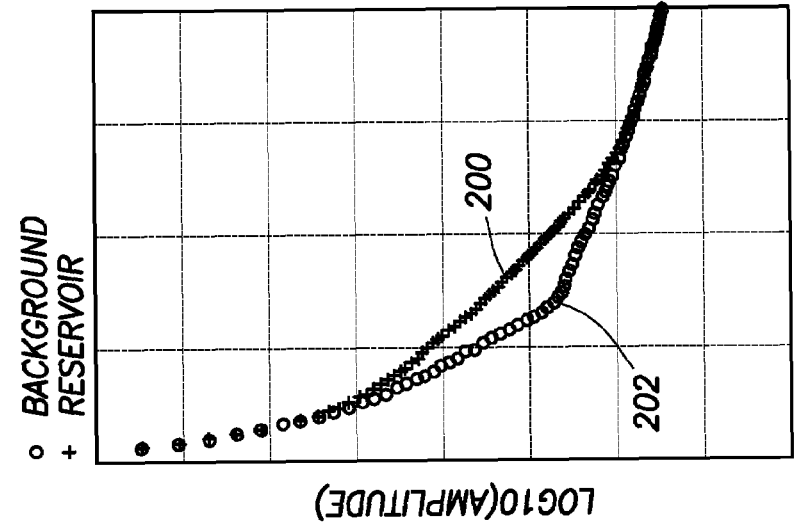

FIG. 2A shows a graph that depicts a relationship between electric field amplitudes detected at a receiver and an offset between the receiver and source (where the offset is the lateral distance between the receiver and source). FIG. 2A depicts an example relationship of a conventional arrangement in which a single source is provided at a depth that is close to the depth of the receiver. In the example of FIG. 2A, it is assumed that the source is about 950 meters below the sea surface, and that the receiver is at the sea floor at 1,000 meters. A curve 200 in FIG. 2A represents simulated electric field amplitudes (as measured by the receiver) as a function of source-receiver offset when a resistive body is present in the subterranean structure. On the other hand, a curve 202 represents simulated amplitudes (as measured by the receiver) as a function of source-receiver offset when the resistive body is not present in the subterranean structure. Thus, as depicted in FIG. 2A, in a conventional arrangement that includes a source and a receiver that are relatively close to each other in depth (50 meters or so), electric amplitudes at the receiver induced by a target resistive body in the subterranean structure can be detected at certain source-receiver offsets (offsets where detectable separation exists between curves 200 and 202 in FIG. 2A).

However, if the receiver remains at the sea floor at 1,000 meters, but the source is raised to a depth of 300 meters (as measured from the sea surface), the relationship of simulated amplitudes as a function of source-receiver offset is depicted in FIG. 2B. In FIG. 2B, curve 200A (which represents amplitudes as a function of source-receiver offset when a resistive body is present) and curve 202A (which represents amplitudes as a function of source-receiver offset when the resistive body is not present) have less separation between them. As a result, a user would have a more difficult time accurately determining whether or not a resistive body is in the subterranean structure. Thus, it can be seen from the FIG. 2B graph that when the source is raised 700 meters above the receiver, an unwanted signal component such as the lateral wave due to the air-wave effect become more dominant, which makes detection of the resistive body in the subterranean structure more difficult.

FIG. 2C illustrates an arrangement that includes a single source and receiver in which the source has been raised to just 5 meters below the sea surface, while the receiver remains at the sea floor 1,000 meters below the sea surface. In this case, the curve 200B (which represents simulated amplitudes corresponding to the resistive body being present in the subterranean structure) and curve 202B (which represents amplitudes corresponding to the resistive body not being present in the subterranean structure) have even less separation, which makes detection of the resistive body even more difficult.

Figure 3:
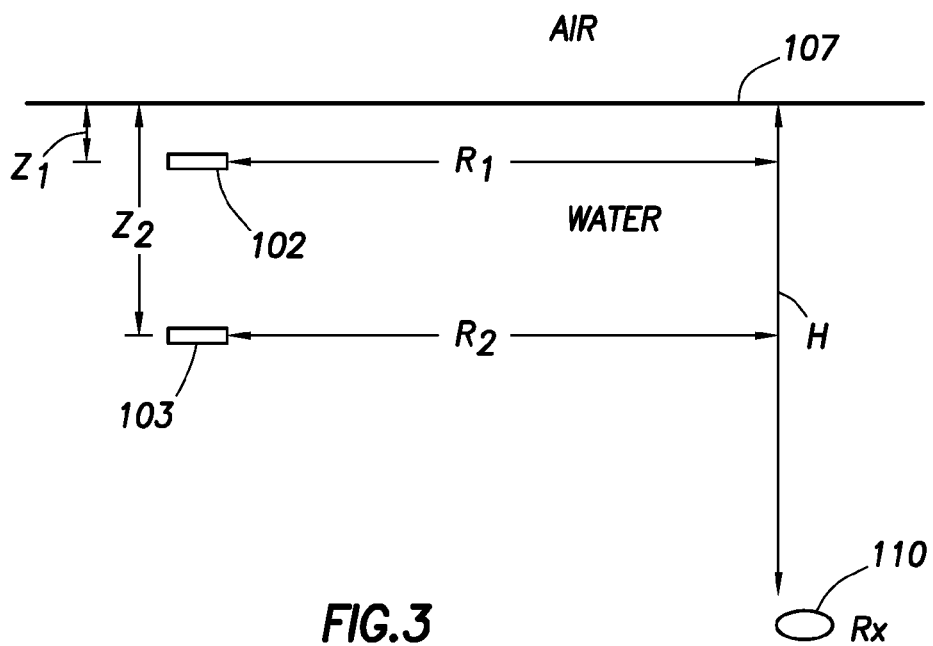
FIG. 3 is an example schematic diagram of the arrangement depicted in FIG. 1.

To address such issues, FIG. 1 shows an over-under source array that uses two sources 102, 103 where one source (the upper source 102) is placed over the other source (the lower source 103). FIG. 3 is a schematic representation of the arrangement of FIG. 1 to illustrate different distances associated with the sources 102, 103 and the receiver 110. The depth of the upper source 102 (distance from the sea surface 107 to the source 102) is $Z_1$, and the depth of the lower source 103 is $Z_2$. The depth of the receiver 110 is H. The lateral offset between the upper source 102 and the receiver 110 is $R_1$, and the lateral offset between the lower source 103 and the receiver 110 is $R_2$. Note that in the over-under arrangement, $R_1$ and $R_2$ can be equal since the sources 102, 103 can be equidistant (laterally) to the receiver 110.

A measured electric field at the receiver 110 is represented by $E_{12}^{z\text{-}bucked}$, which represents a bucked electric field in which an undesired component of the electric field measurement, such as the air wave, has been reduced or eliminated. The reduction or elimination of the air wave is achieved by separating the measured electric field in to two components, one with respect to the first source 102 and another with respect to the second source 103. The amplitudes and phases of the signal produced by the sources 102, 103 may be adjusted to allow for the reduction or elimination of the air-wave effect or other undesired component. The bucked electric field $E_{12}^{z\text{-}bucked}$ is expressed as follows:

$$E_{12}^{z-bucked} = E_1 \left[ e^{-k_{sw}(Z_2 - Z_1)} \left( \frac{R_1}{R_2} \right)^3 \right] - E_2, \quad \text{(Eq. 2)}$$

where $E_1$ is the effect at the receiver 110 from transmitter 102, $E_2$ is the effect at the receiver 110 from the second transmitter 103, and $k_{sw}$ is the propagation constant or wave number for seawater. The propagation constant $k_{sw}$ is expressed as:

$$k_{sw} = \sqrt{2\pi i f \mu \sigma_{sw}}, \quad \text{(Eq. 3)}$$

where the notation i represents the square root of negative one ($\sqrt{-1}$), f represents signal frequency, $\mu$ represents the magnetic permeability of the medium, which is assumed to be that of free space ($\mu = \mu_0 = 4\pi r 10^{-3}$ H/m), and $\sigma_{sw}$ represents the conductivity of seawater.

Figure 4:
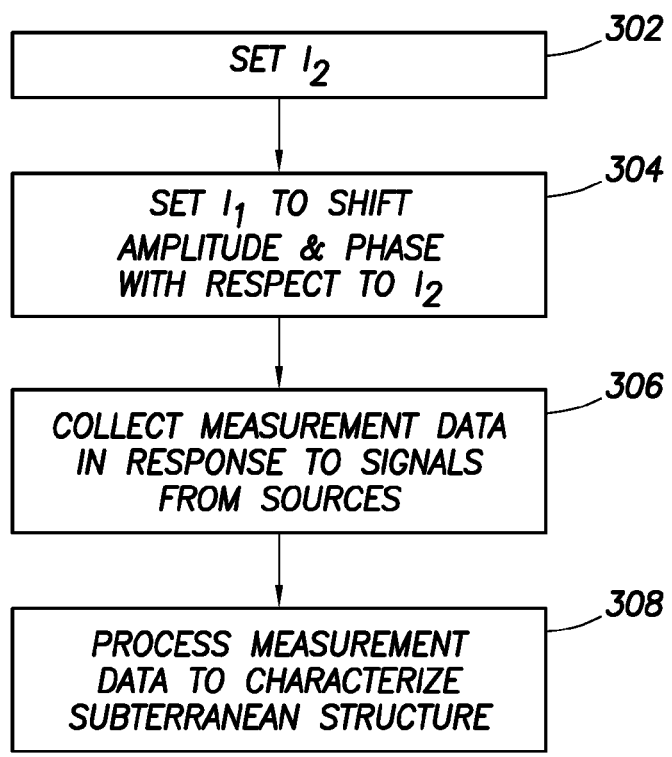
FIG. 4 is a flow diagram of an example surveying process in accordance with an embodiment.

FIG. 4 illustrates a survey procedure using the over-under arrangement of signal sources depicted in FIGS. 1 and 3. First, the amplitude and phase of the current $I_2$ for the signal that is output by the lower transmitter 103 is set (at 302). The signal can be a sinusoidal signal, in one example. Note that the control of amplitudes and phases of signals output by the transmitters 102 and 103 can be controlled by the signal generator 108 of FIG. 1. Given $I_2$, the current $I_1$ for the signal output by the transmitter 102 is set (at 304) by shifting the amplitude and phase of $I_1$ by amounts according to $$e^{-k_{sw}(Z_2 - Z_1)} \left( \frac{R_1}{R_2} \right)^3$$

which is the multiplier of $E_1$ in Eq. 1 above). The propagation constant $k_{sw}$ is a complex number that has both an amplitude component and a phase component. The amplitude and phase of $I_1$ is shifted by amounts based on the multiplier $$e^{-k_{sw}(Z_2 - Z_1)} \left( \frac{R_1}{R_2} \right)^3$$

such that the air wave at the receiver 110 is reduced or eliminated.

In one example, the phase of the first transmitter 102 is first shifted by 180°, so that the unwanted effect is close to being 180° out of phase with the unwanted effect from the second transmitter 103, and the unwanted effects will cancel out. The additional adjustment to the phase and current amplitude of the first transmitter 102 is based on the expression $$e^{-k_{sw}(Z_2 - Z_1)} \left( \frac{R_1}{R_2} \right)^3,$$

which accounts for the fact that the received signal at the receiver 110 will not be exactly 180° out of phase due to the different spacings between the receiver 110 and the transmitters 102, 103.

The electric fields induced by the transmitters 102 and 103 are received and collected by the receiver 110 and measurement data is collected (at 306) in response to such signals. The collected measurement data is then processed (at 308), usually at a later time (such as by the computer 116 of FIG. 1) to characterize the subterranean structure 105 for determining whether a resistive body is present in the subterranean structure.

Figure 5:
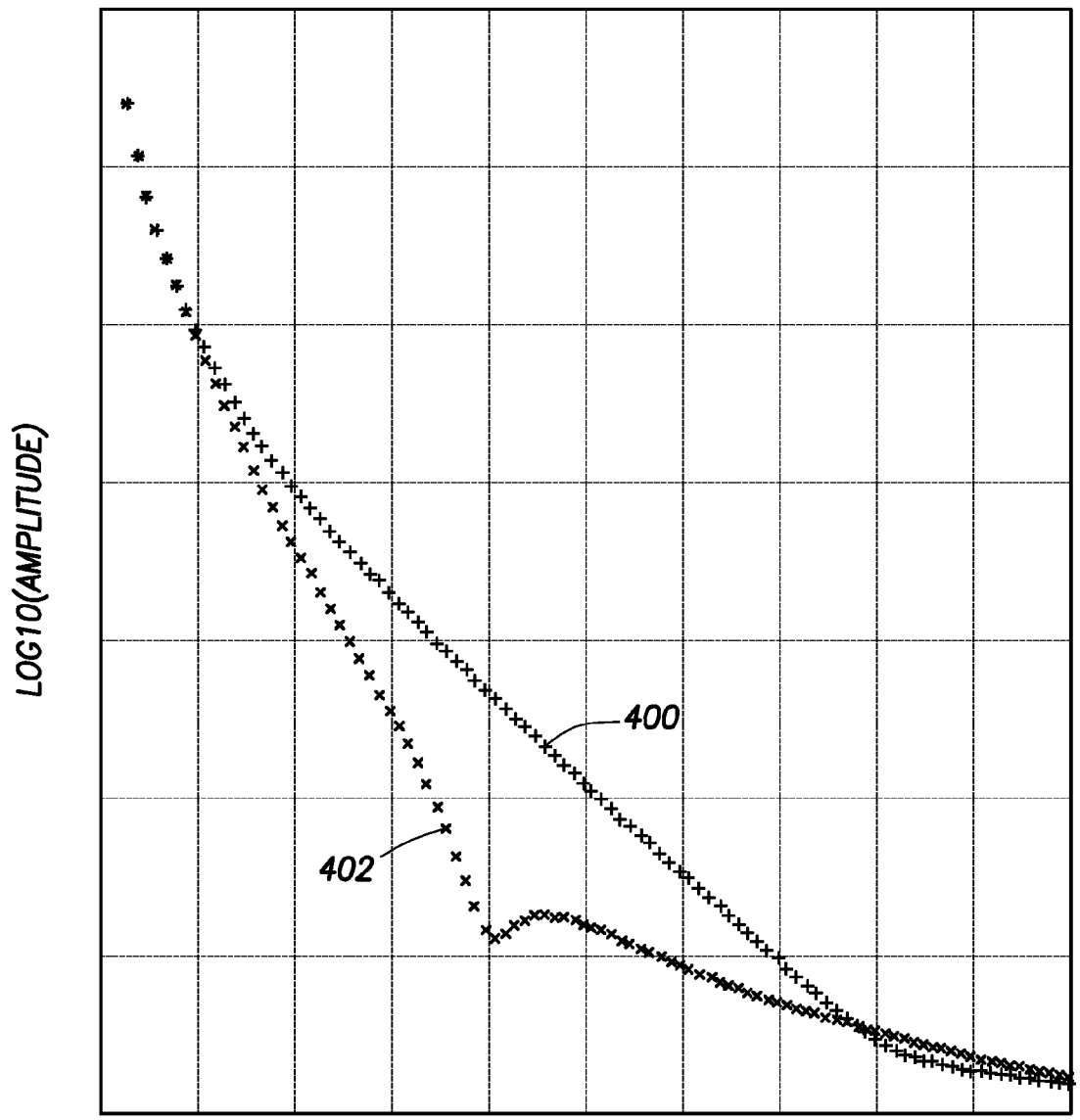
FIG. 5 is an example graph illustrating a relationship of signal amplitudes as a function of source-receiver offsets for the surveying arrangement of FIG. 1.

FIG. 5 depicts a graph showing curves 400 and 402 representing simulated data taken using the arrangement of FIG. 1. The curve 400 represents amplitudes as a function of source-receiver offset when a resistive body is present, and curve 402 represents amplitudes as a function of source-receiver offset when a resistive body is not present in the subterranean structure. As depicted in FIG. 5, with the lateral wave reduced or eliminated, a detectable separation is provided between the curve 400 and curve 402 at certain source-transmitter offsets (corresponding to the $R_1$ and $R_2$ values in FIG. 3). This separation allows for more accurate characterization of the subterranean structure 105 to better detect whether or not the resistive body 109 is present in the subterranean structure.

Figure 6:
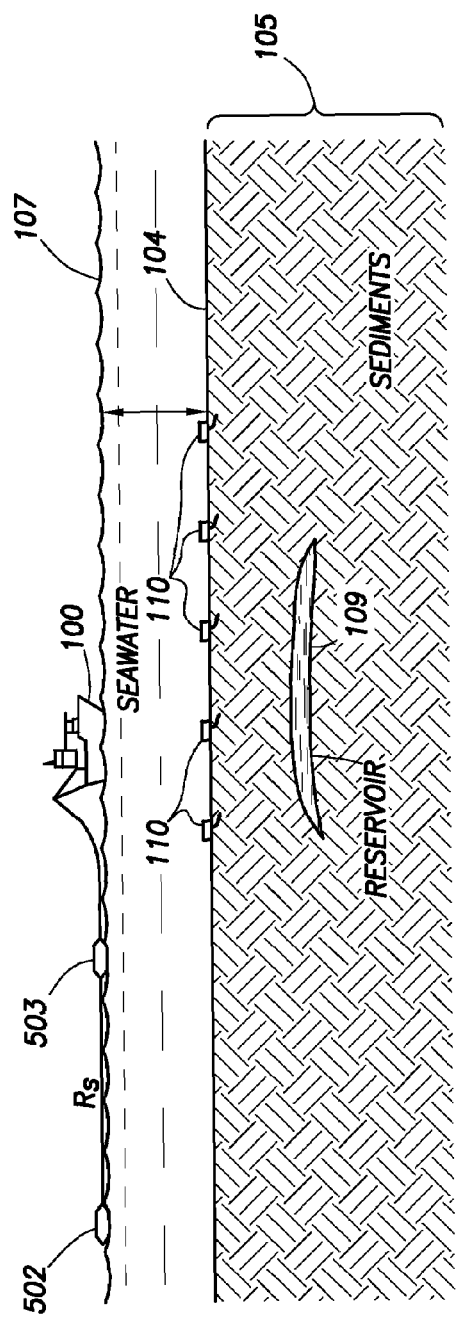
FIG. 6 shows another example arrangement of signal sources used for performing a CSEM survey.

FIG. 6 shows a different arrangement of transmitters (502 and 503) as towed by the sea vessel 100. The FIG. 6 arrangement is an inline arrangement in which the sources 502, 503 are at the same depth at or near the sea surface 107. The sources 502 and 503 are separated by a distance $R_1$, as depicted in FIG. 6. The amplitudes and phases of the output signals produced by the sources 502, 503 may tuned such that an unwanted signal component (e.g., air wave) is reduced or eliminated. In one example, Eq. 2, above, may be used to determine the phase and current amplitude shift required to achieve the desired cancellation.

For the example arrangements shown in FIG. 1 and FIG. 6, the distances between the sources (vertical distances in the FIG. 1 arrangement and horizontal distance in the FIG. 6 arrangement) can be adjusted on a survey-by-survey basis. In other words, for different surveys in different environments, the distances between the sources can be adjusted for optimization.

It is noted that for an in-line configuration, the system would have to be tuned to a specific receiver. In that configuration, any additional receivers used in the survey may have unwanted signal components. In the over-under configuration, however, the system may cancel the unwanted signal components for all receivers used in a survey.

Figure 7:
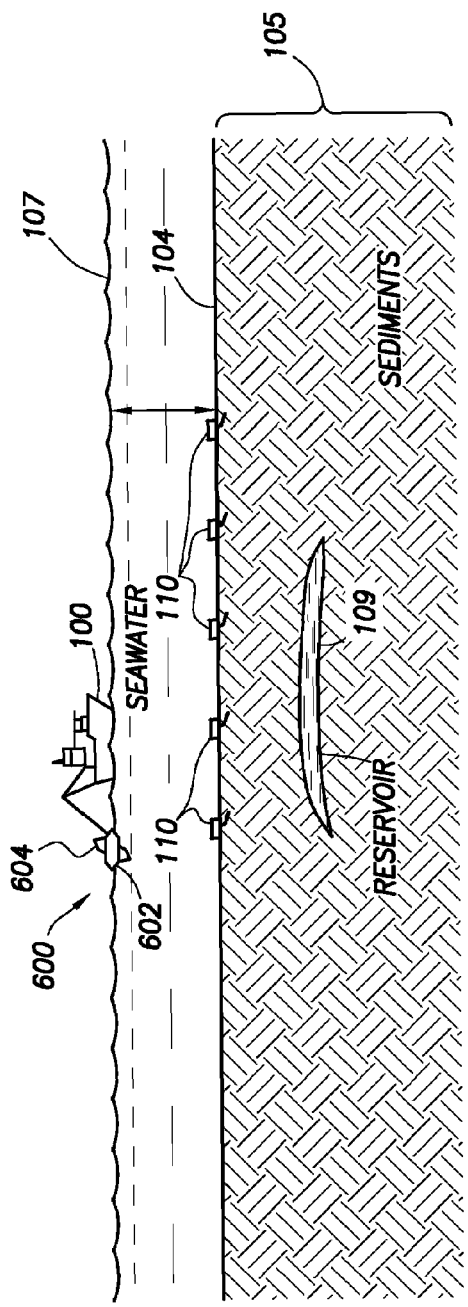
FIG. 7 shows another example arrangement of signal sources used for performing a CSEM survey.

FIG. 7 illustrates yet another arrangement, in which the source array includes a crossed dipole source array to produce both inline and cross-line fields. The crossed-dipole source array includes two sources 600, 604 that are crossed with each other, where the crossed-dipole source has an inline source 600 that is in line with the direction of the travel, and a cross-line source 604 that is orthogonal with respect to the in line source 600. In one particular example, the in line source 600 is aligned with a line of receivers 110, that the receivers 110 are in line with the source 600.

The inline source 600 provides an inline survey configuration that is relatively sensitive to a thin resistive layer, the air-wave, and the gross subterranean structure, and the cross-line source provides a cross-line survey configuration that is relatively sensitive to the air-wave and the gross subterranean structure but is relatively insensitive to presence of a thin resistive layer. Using the crossed-dipole source array, the electric filed measured due to the cross-line source may be subtracted from the electric field measured in response to the inline source to derive an electric field that is relatively more sensitive to the thin resistive body and less sensitive to the air-wave.

In one example, the receiver may collect EM data, and the separation between in-line data and cross-line data may be made in the subsequent modeling and analysis. In another example, a receiver may be programmed to separate the inline data from the cross-line data and subtract the cross-line data from the in-line data. The resulting data may be stored for later retrieval.

Thus, as described, some embodiments of the invention include arrangements of signal sources that produce signals that are set to reduce or eliminate signal components that are insensitive to the effects of the subterranean structure. With the over-under arrangement (FIG. 1) and the inline arrangement (FIG. 6), the amplitudes and phases (or other characteristics) of signals are set such that the unwanted signal component is reduced/eliminated at the receiver. With the crossed-dipole source arrangement, the crossed arrangement of the two sources allows for receipt of electric fields that cancel the air-wave effect.

Instructions of software described above (including analysis software 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A surveying method for use in a marine environment to survey a subterranean structure, comprising:
providing an arrangement of plural signal sources in a body of water to produce corresponding signals;
providing a receiver in the body of water to receive data responsive to the signals of the signal sources;
receiving depth information including vertical distances between the receiver and the corresponding signal sources;
receiving lateral offset information including lateral offsets between the receiver and the corresponding signal sources;
setting, based on the depth information and lateral offset information, the signals of the signal sources in the arrangement to cause reduction of at least one predetermined signal component in the data received by the receiver in response to the signals.

2. The method of claim 1, wherein the predetermined signal component is one selected from an air wave, a direct wave, and combinations thereof.

3. The method of claim 1, wherein providing the arrangement of signal sources comprises providing an over-under arrangement in which one signal source is provided over another signal source.

4. The method of claim 1, wherein providing the arrangement of signal sources comprises providing an inline anangement of the signal sources in which one signal source is laterally spaced apart from another signal source.

5. The method of claim 1, wherein the signal sources include a first transmitter and a second transmitter, and wherein setting the signals of the signal sources in the arrangement comprises selecting a phase and cunent amplitude of the second transmitter and selecting a phase and current amplitude for the first transmitter with respect to the second transmitter based on the depth information and the lateral offset information.

6. The method of claim 1, wherein the signal sources include a first transmitter and a second transmitter, wherein setting the signals of the signal sources in the arrangement is based on the following expression:

$$E_{12}^{z-bucked} = E_1\left[e^{-k_{sw}(Z_2-Z_1)}\left(\frac{R_1}{R_2}\right)^3\right] - E_2$$

where $E_1$ is the effect at the receiver from the first transmitter, $E_2$ is the effect at the receiver from the second transmitter, $k_{sw}$ is a propagation constant, $Z_1$ is the vertical distance between the first transmitter and the receiver, $Z_2$ is the vertical distance between the second transmitter and the receiver, $R_1$ is the lateral offset between the first transmitter and the receiver, and $R_2$ is the lateral offset between the second transmitter and the receiver.

7. The method of claim 1, wherein providing the arrangement of signal sources comprises towing the arrangement of signal sources by a sea vessel.

8. The method of claim 7, wherein towing the anangement of signal sources comprises towing the signal sources at a shallow depth, the method further comprising providing the receiver at or near the sea floor.

9. The method of claim 8, wherein towing the signal sources at shallow depth comprises towing the signal sources at a depth of about 10 meters.

10. The method of claim 7, wherein towing the signal sources comprises towing the signal sources at or near a sea surface, the method further comprising providing the receiver at a depth of 300 meters or more.

11. A system to survey a subterranean structure, comprising:
an arrangement of plural signal sources in a body of water to produce corresponding signals;
a receiver to collect data in response to the produced signals; and
a signal generator responsive to depth information and lateral offset information to set the signals produced by the signal sources to reduce at least one predetermined signal component in the data collected at the receiver in response to the produced signals, wherein the depth information includes vertical distances between the receiver and the corresponding signal sources, and the lateral offset information includes lateral offsets between the receiver and the corresponding signal sources.

12. The system of claim 11, wherein the at least one predetermined signal component comprises one selected from an air wave, a direct wave, and combinations thereof.

13. The system of claim 11, wherein the signal sources comprise controlled source electromagnetic (CSEM) signal sources.

14. The system of claim 11, further comprising a computer to process the data collected by the receiver to characterize the subterranean structure.

15. The system of claim 11, wherein the signal generator is configured to set the signals produced by the sources by shifting an amplitude and phase of a signal produced by a first signal source with respect to a signal produced by a second signal source.

16. The system of claim 11, wherein the arrangement of signal sources includes an over-under arrangement in which one signal source is over another signal source.

17. The system of claim 11, wherein the arrangement of signal sources includes an inline arrangement of the signal sources in which one signal source is laterally spaced apart from another signal source.

\* \* \* \* \*